(12) United States Patent
Rohrbach

(10) Patent No.: US 7,505,583 B2
(45) Date of Patent: *Mar. 17, 2009

(54) ELECTRONIC DEVICE HOLDER

(75) Inventor: Matthew Rohrbach, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 715 days.

This patent is subject to a terminal disclaimer.

(21) Appl. No.: 11/069,391

(22) Filed: Feb. 28, 2005

(65) Prior Publication Data

US 2005/0147951 A1  Jul. 7, 2005

Related U.S. Application Data

(62) Division of application No. 10/162,818, filed on Jun. 3, 2002, now Pat. No. 7,099,467.

(51) Int. Cl.
 *H04M 1/00* (2006.01)
(52) U.S. Cl. ..................................... 379/455
(58) Field of Classification Search ............... 379/446, 379/438, 455
 See application file for complete search history.

(56) References Cited

U.S. PATENT DOCUMENTS

| 5,490,653 | A | 2/1996 | Ingwersen |
| 6,189,755 | B1 | 2/2001 | Wakefield |
| 6,246,766 | B1 | 6/2001 | Walsh |
| 6,253,982 | B1 | 7/2001 | Gerardi |
| 2002/0049081 | A1* | 4/2002 | Heininger ............. 455/575 |

* cited by examiner

*Primary Examiner*—Alexander Jamal
(74) *Attorney, Agent, or Firm*—Beyer Law Group LLP

(57) ABSTRACT

An apparatus that can secure an electronic device and be inserted into a conventional cup holder is described. The cup holder, for example, is inside of an automobile. The electronic device being held can be a variety of devices that include a digital music player. One embodiment of the invention includes a spool about which connecting cable can be wound. Adapting sleeves that fit around the base of the apparatus can be used to adapt electronic device holder to cup holders of different sizes and shapes.

7 Claims, 5 Drawing Sheets

ELECTRONIC DEVICE HOLDER

CROSS-REFERENCE TO RELATED APPLICATION

This application is a divisional application of U.S. patent application Ser. No. 10/162,818, filed Jun. 3, 2002 now U.S. Pat. No. 7,099,467, and entitled "ELECTRONIC DEVICE HOLDER," which is hereby incorporated herein by reference.

FIELD OF THE INVENTION

The present invention relates generally to electronic device accessories, and more specifically to cup holder adaptors.

BACKGROUND OF THE INVENTION

Digital music players are becoming more popular as personal entertainment devices. The attractiveness of digital music players is in their capability of storing and playing large amounts of music and their ability to play music without skipping. These attributes make digital music players ideal for use in different environments including automobile environments. However for automobile use, it is desirable to use a mounting device to secure the digital music player within the car. Otherwise, the jostling caused by the car's movement can damage the digital music player. Also beneficial is a mounting device capable of managing the length of the cable used to connect the player to the car's audio system. This is especially beneficial when lengthy cables can be messy and cause a hazard in which passengers can get their feet entangled. Specialized mounting devices are required to secure the digital music players since most automobiles do not come with digital device holders.

However, specialized mounting devices are difficult to install because special parts are typically required to attach the devices to car interiors. Also, specialized mounting devices usually cannot manage the length of cables. Therefore, in view of the foregoing, an electronic device holder that easily adapts to automobile interiors and which can manage the length of interconnecting cables would be desirable.

BRIEF SUMMARY OF THE INVENTION

The present invention is directed to an apparatus that can secure an electronic device and be inserted into a conventional cup holder so that the cup holder is essentially converted so that it holds an electronic device. The cup holder, for example, is inside of an automobile. The electronic device being held can be a variety of devices that include a digital music player.

One aspect of the invention relates to an electronic device holder that includes a pocket component having a pocket suitable for receiving an electronic device and a base component having cup shape configured to be attached to the pocket component. The base component is suitable to be securely inserted into a cup holder.

Another aspect of the invention relates to an electronic device holder suitable for securely holding an electronic device and for managing at least a portion of a cable used to connect an electronic device to an external electrical system. The electronic device holder includes a pocket component having a pocket suitable for receiving an electronic device and a spool extending from the pocket component about which the cable can be wound. The electronic device holder also includes a base component having a cup shape, an interior chamber suitable for receiving the spool, and a first cable slot that allows the cable to be inserted into the interior chamber. The base component is attached to the pocket component and the base component is suitable to be securely inserted into a cup holder.

Yet another aspect of the invention pertains to an electronic device holding system that includes a cup holder and an electronic device holder.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The present invention relates to an apparatus that can secure an electronic device and be inserted into a conventional cup holder so that the cup holder is essentially converted so that it holds an electronic device. The cup holder, for example, is inside of an automobile. The electronic device being held can be a variety of devices that include a digital music player.

Figure 1:
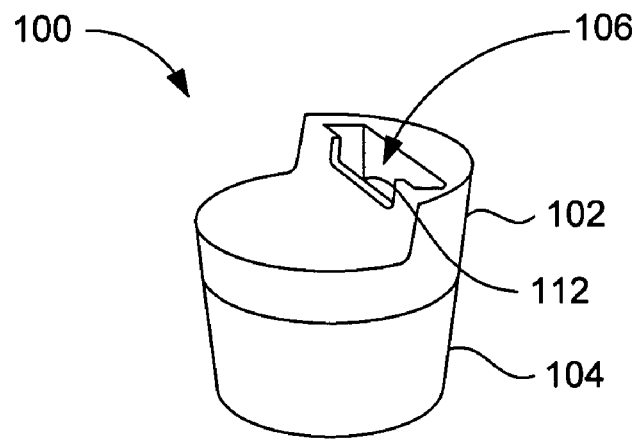
FIG. 1 illustrates a perspective view of an electronic device holder according to one embodiment of the present invention.
Figure 2:
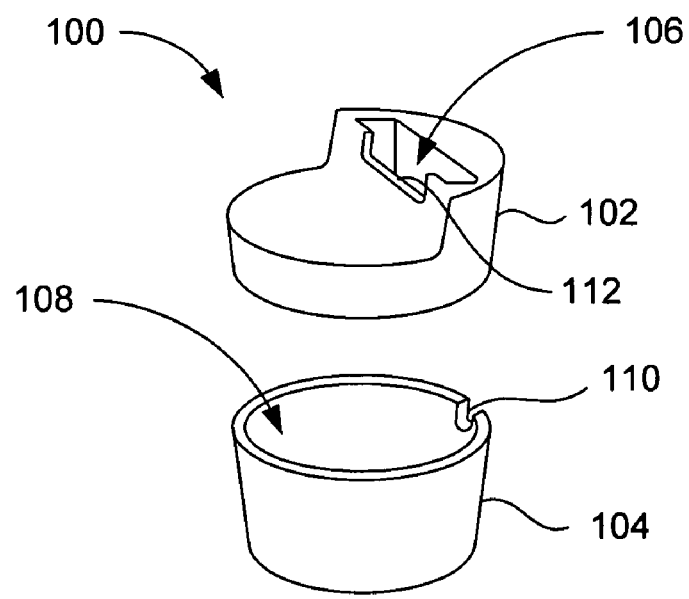
FIG. 2 illustrates a perspective view of electronic device holder when it is separated into its two component parts.

FIG. 1 illustrates a perspective view of an electronic device holder 100 according to one embodiment of the present invention. Electronic device holder 100 is made of two components, the pocket component 102 and the base component 104. These two components 102 and 104 can be attached to each other as shown in FIG. 1, or they can be separated from each other as shown in FIG. 2. FIG. 2 illustrates a perspective view of electronic device holder 100 when it is separated into its two component parts.

Figure 3:
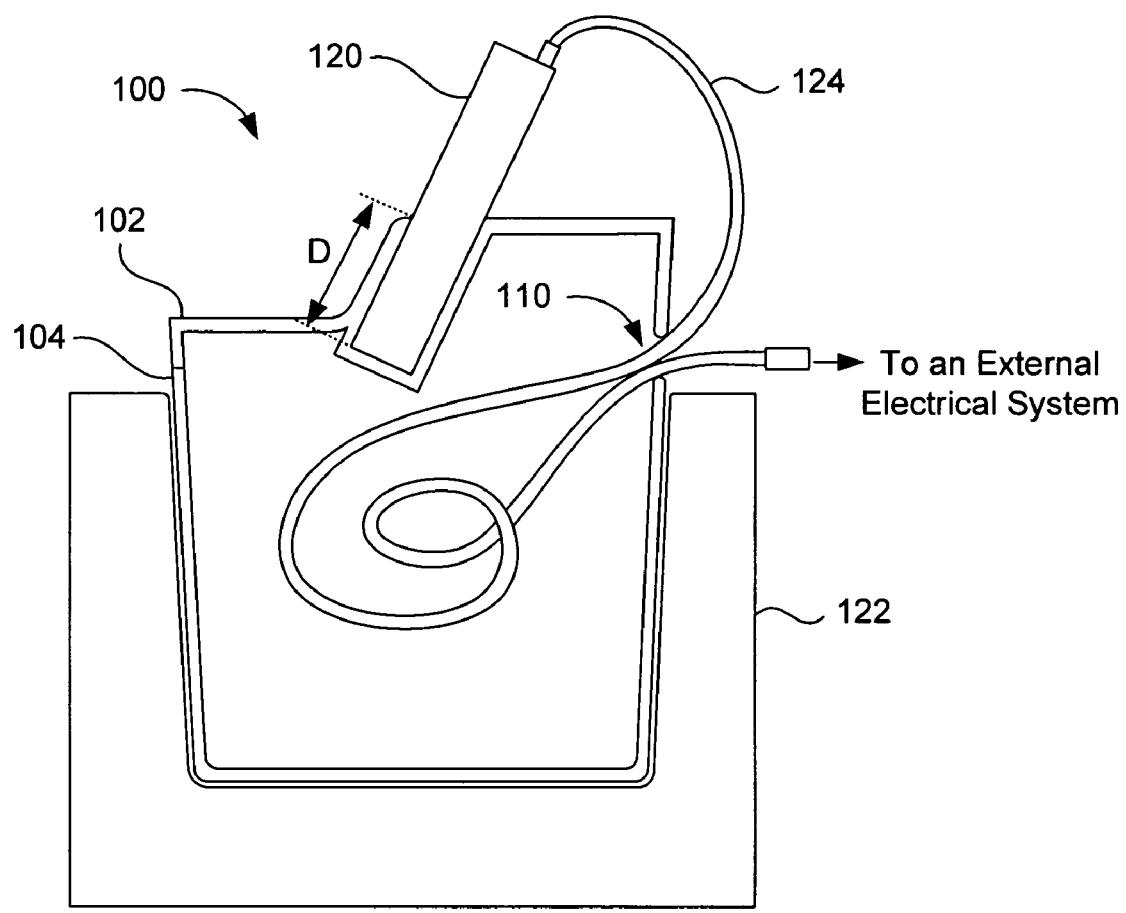
FIG. 3 illustrates a side plan, cross-sectional view of electronic device holder holding an electronic device where the electronic device holder is inserted into a cup holder.

Pocket component 102 contains a pocket 106 that is sized to receive and hold an electronic device. Base component 104 is cup shaped with an empty chamber 108, which can be used to manage and store a portion of a cable used to connect the electronic device to an external electrical system. FIG. 3 illustrates a side plan, cross-sectional view of electronic device holder 100 holding an electronic device 120 where the electronic device holder 100 is inserted into a cup holder 122. Cup holder 122 can be in various environments such as an automobile, airplane, boat, motorcycle, bicycle, etc. Cable 124 is used to connect electronic device 120 to an external electrical system (not shown). As shown, cable 124 is connected to electronic device 120, extends into and then out of electronic device holder 100 where it can then be plugged into the external electrical system. Cable 124 enters and exits electronic device holder through a slot 110 created in base component 104. In some embodiments, slot 110 can be created in pocket component 102, base component 104, or both pocket and base components. The length of cable 124 can be neatly managed by storing a selected length of cable 124 within electronic device holder 100. In one embodiment, electronic device 120 is a digital music player that is to be connected to an automobile's audio system. In other embodiments, electronic device 120 can be a variety of devices that include a memory device or a mobile communications device.

Pocket 106 of pocket component 102 can have a variety of sizes and shapes to fit variously shaped electronic devices. In some embodiments, pocket 106 is shaped to conform closely to the shape of an electronic device. As seen in FIG. 3, the depth, D, of pocket 106 should be of sufficient depth to securely hold electronic device 120. As seen in FIGS. 1 and 2, a low-cut window 112 is formed in the front region of pocket 106. Depending upon the specific electronic device placed in pocket 106, window 112 can provide access to control buttons or switches on the front face of electronic device 120. It is noted that pocket 106 can have a variety of shapes even though pocket 106 is shown to have a two-tiered top surface in the figures throughout the description.

Again, base component 104 has a cup shape so that it easily inserts into a cup holder. However in alternative embodiments, base component 104 can have a variety of shapes so that it may insert into variously shaped cup holders or recesses. In other words, base component 104 can be shaped so that electronic device holder 100 can be installed in various cup holders or recesses. For instance, the bottom of base component 104 can have a shape of the interior of an ashtray so that it can be inserted into the ashtray.

Contact between base component 104 and cup holder 122 can occur at the outer side surfaces and/or the bottom surface of base component 104. In some embodiments, base component 104 sits on the bottom surface of cup holder 122 without being tightly restrained by the sidewalls of cup holder 122. In other embodiments, base component 102 does not touch the bottom surface of cup holder 122 and is secured like a cork in a wine bottle by the cup holder's sidewalls. In yet other embodiments, base component 102 rests on the bottom surface and is secured like a cork by cup holder 122.

Pocket component 102 fits on top of base component 104 in a manner analogous to which a soft drink lid fits over a paper cup. In alternative embodiments however, pocket component 102 is secured to base component such that pocket component 102 rotates. In this embodiment, a user can rotate pocket component 102 so that the inserted electronic device can face a desired direction.

Figure 4:
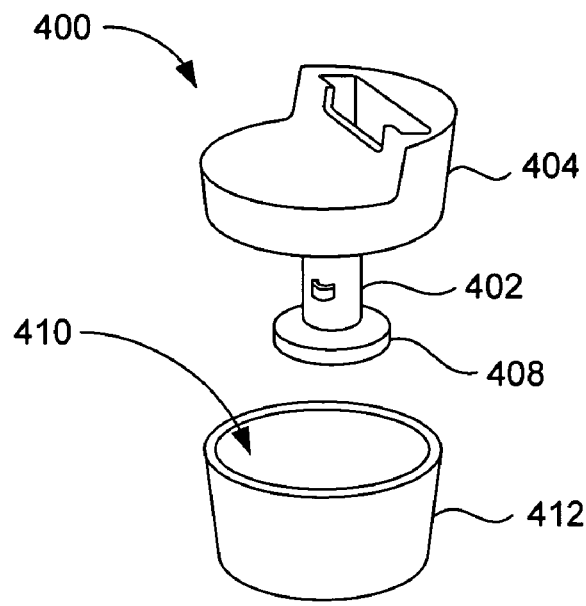
FIG. 4 illustrates a perspective view of an electronic device holder that has a spool extending from pocket component according to one embodiment of the present invention.

FIG. 4 illustrates a perspective view of an electronic device holder 400 that has a spool 402 extending from pocket component 404 according to one embodiment of the present invention. A cable used to connect an electronic device to an external electrical system can be neatly managed by winding it around spool 402. A latch 406 extends from spool 402, which can be used to clip a cable to spool 402. Retaining plate 408 is formed at the bottom of spool 402 and is useful for preventing cable that is wound about spool 402 from falling off. Spool 402 fits within chamber 410 of base component 412 when pocket and base components 404 and 412 are placed together.

Figure 5:
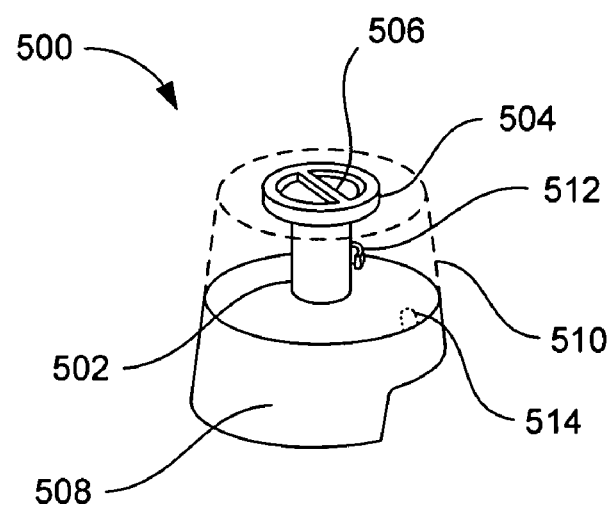
FIG. 5 illustrates a bottom perspective view of electronic device holder wherein the pocket component has a rotating spool according to one embodiment of the present invention.

FIG. 5 illustrates a bottom perspective view of electronic device holder 500 wherein pocket component 508 has a rotating spool 502 according to one embodiment of the present invention. Retaining plate 504 has a grooved handle 506, which can be used to rotate spool 502. Base component 510, which is shown in dashed lines, has a hole in its bottom surface that allows retaining plate 504 to extend through. By clipping a cable into latch 512, then placing pocket and base components 508 and 510 together while slipping the cable in slot 514, a user can wind the cable onto the spool by twisting retaining plate 504. Again, slot 514 can be formed in base component, pocket component or both base and pocket components 508 and 510. Normally, a user will wind the cable until an amount of cable in excess of what is needed to connect the electronic device to an external electrical system is collected into electronic device holder 500.

Figure 6:
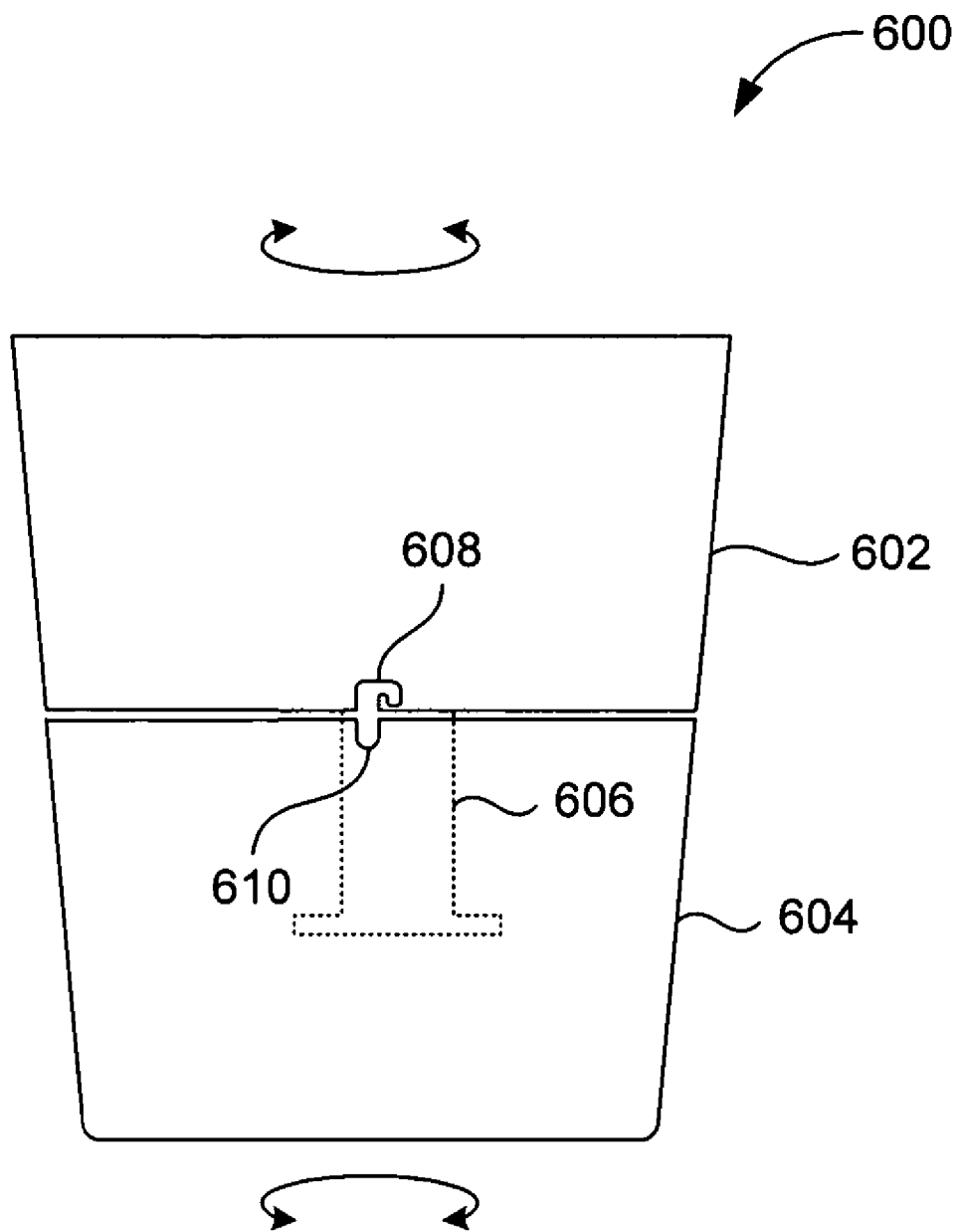
FIG. 6 illustrates a side plan view of electronic device holder wherein the pocket component can rotate with respect to the base component to wind a cable into the chamber of the base component.

FIG. 6 illustrates a side plan view of electronic device holder 600 wherein pocket component 602 can rotate with respect to base component 604 to wind a cable into the chamber of base component 604. A non-rotating spool 606 extends from pocket component 602 into the chamber of base component 604. Pocket component 602 has a hook-shaped slot 608 and base component has a vertical slot 610, both of which allow a cable to enter electronic device holder 600. Hook-shaped slot 608 is designed to secure a portion of a cable that extends from an electronic device held within the pocket of pocket component 602. The cable extends through hook-shaped slot 608, loops around spool 606 and then exits electric device holder 600 through vertical slot 610. Then as a user twists base component 604 with respect to pocket component 602, vertical slot 610 guides and winds the cable about spool 606 in a similar manner to which a fishing reel collects fishing line. Hook-shaped slot 608 can have a variety of shapes that are capable of securing a cable while preventing it from being caught in vertical slot 610 during winding.

Figure 7:
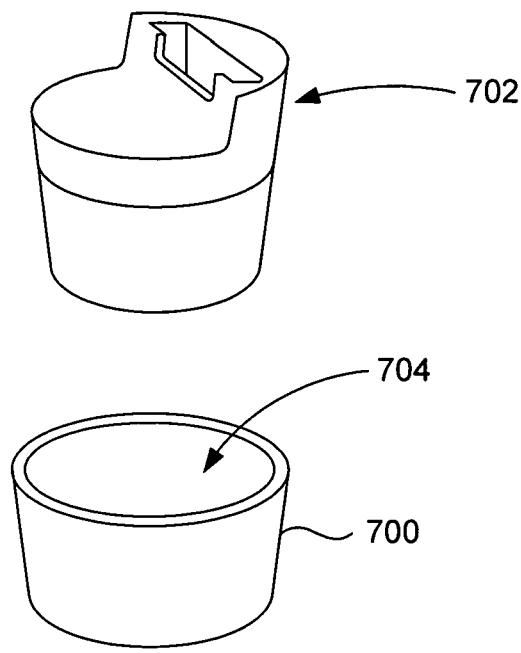
FIGS. 7 and 8 illustrate adapting sleeves, which are used to adapt an electronic device holder to cup holders of different shapes and sizes.
Figure 8:
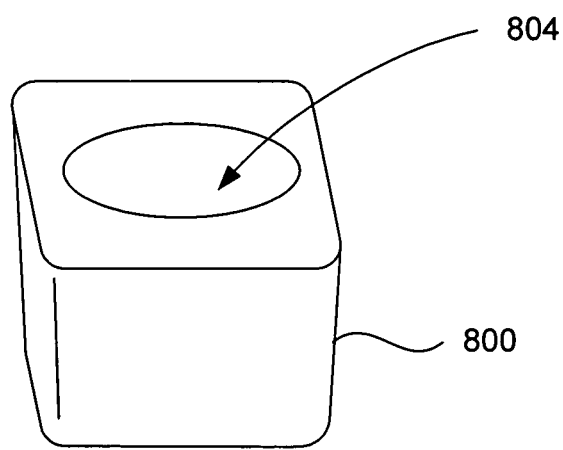

FIGS. 7 and 8 illustrate adapting sleeves 700 and 800 respectively, which are used to adapt an electronic device holder 702 to cup holders of different shapes and sizes. Adapting sleeves 700 and 800 have inner cavities 704 and 804, respectively, that can receive and securely hold electronic device holder 702. Adapting sleeves 700 and 800 have outer surfaces that are shaped and sized to fit into cup holders that would otherwise be too big to securely hold electronic device holder 702. These adapting sleeves can have various thicknesses depending upon the size of the cup holder into which an electronic device holder is to be placed. In situations where a cup holder is much larger than an electronic device holder, two or more adapting sleeves can be used. For example, an adapting sleeve can be placed over another adapting sleeve. Note that adapting sleeve 800 has a square outer contour so that electronic device holder 702 can be used with a square cup holder or recess.

In some embodiments, a wireless transceiver can be installed within electronic device holder. An electronic device can be plugged into the wireless transceiver so that the device can wirelessly communicate with an external system, such as a car audio system.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

I claim:

1. An electronic device holder suitable for securely holding an electronic device and for managing at least a portion of a cable used to connect an electronic device to an external electrical system comprising:
    a pocket component having a pocket suitable for receiving an electronic device and a spool extending from the pocket component about which the cable can be wound; and
    a base component having a cup shape, an interior chamber suitable for receiving the spool, and a first cable slot that allows the cable to be inserted into the interior chamber, wherein the base component is configured to be attached to the pocket component and wherein the base component is suitable to be securely inserted into a cup holder.

2. An electronic device holder as recited in claim 1 wherein the spool of the pocket component rotates about its longitudinal axis and a latch extends from the spool, the latch serving to secure a portion of the cable so that the cable can be wound about the spool by rotating the spool.

3. An electronic device holder as recited in claim 2 wherein the base component has a bottom surface that has an opening, whereby the spool extends through the opening when the pocket component is attached to the base component such that the spool can be manually rotated.

4. An electronic device holder as recited in claim 1 wherein the pocket component contains a second cable slot that allows the cable to be inserted into the interior chamber and wherein the spool has a latch configured to secure a portion of the cable.

5. An electronic device holder as recited in claim 4 wherein the pocket component is rotatably secured to the base component such that the cable can be wound about the spool by rotating the pocket component with respect to the base component.

6. An electronic device holding system comprising:
    a cup holder;
    an electronic device holder that includes
    a pocket component having a pocket suitable for receiving an electronic device; and
    a base component having cup shape configured to be attached to the pocket component wherein the base component is securely inserted into the cup holder and having an interior chamber suitable for storing a cable and a cable slot that allows the cable to be inserted into the interior chamber.

7. An electronic device holding system as recited in claim 6 further comprising:
    a cable that extends from the electronic device and into the interior chamber of the base component through the cable slot.

* * * * *